United States Patent [19]

Masaki

[11] 4,233,811
[45] Nov. 18, 1980

[54] EXHAUST GAS REACTION CONTROL SYSTEM

[76] Inventor: Kenji Masaki, No. 30-8, Nagahama, Kanazawa-ku, Yokohama City, Japan

[21] Appl. No.: 898,021

[22] Filed: Apr. 20, 1978

Related U.S. Application Data

[63] Continuation of Ser. No. 690,106, May 26, 1976, abandoned.

[30] Foreign Application Priority Data

May 30, 1975 [JP] Japan .................................. 50/64998

[51] Int. Cl.$^3$ .......................... F01N 3/10; F01N 3/14; F02M 25/06
[52] U.S. Cl. ...................................... 60/274; 60/276; 60/277; 60/278; 60/286; 60/289; 60/285
[58] Field of Search ................. 60/285, 286, 290, 289, 60/276, 278, 277, 274; 123/119 A, 119 EC

[56] References Cited

U.S. PATENT DOCUMENTS

| | | | |
|---|---|---|---|
| 3,086,353 | 4/1963 | Ridgway | 60/290 |
| 3,306,033 | 2/1967 | Cornelius | 123/119 A |
| 3,807,172 | 4/1974 | Masaki | 60/285 |
| 3,851,469 | 12/1974 | Eichler | 60/285 |
| 3,906,910 | 9/1975 | Szlaga | 123/119 EC |
| 3,910,042 | 10/1975 | Yuge | 60/286 |
| 3,927,523 | 12/1975 | Shioyama | 60/285 |
| 3,949,551 | 4/1976 | Eichler | 60/276 |
| 3,979,905 | 9/1976 | Masaki | 60/289 |
| 3,986,352 | 10/1976 | Casey | 60/289 |

FOREIGN PATENT DOCUMENTS 2336600  2/1974 Fed. Rep. of Germany ............. 60/289

*Primary Examiner*—Douglas Hart
*Attorney, Agent, or Firm*—Robert E. Burns; Emmanuel J. Lobato; Bruce L. Adams

[57] ABSTRACT

The temperature of an engine exhaust gas treating device is maintained above a first predetermined value, above which the treating device can purify engine exhaust gases, by interrupting to control an air-fuel ratio of an air-fuel mixture burned in the engine to a desired value and having a mixture forming device form a rich air-fuel mixture, and further by providing a spark in the treating device, retarding the engine ignition timing and/or supplying secondary air into the engine exhaust gases when the treating device temperature is less than the predetermined value, and by resuming to control the air-fuel ratio to the desired value when the treating device temperature is higher than the predetermined value, and below a second predetermined value, below which the treating device is prevented from being damaged by heat, by stopping production of the spark and supply of the secondary air and restoring the engine ignition timing to a normal condition when the treating device temperature is higher than the second predetermined value.

4 Claims, 3 Drawing Figures

EXHAUST GAS REACTION CONTROL SYSTEM

This is a continuation, of application Ser. No. 690,106, filed 5-26-1976, now abandoned.

The present invention relates generally to an exhaust gas reaction control system for maintaining the temperature in an exhaust gas treating device above a first predetermined temperature above which the exhaust gas treating device can purify the engine exhaust gases and below a second predetermined temperature below which the treating device is prevented from being damaged by heat and particularly to an exhaust gas reaction control system of this type which interrupts to control the air-fuel ratio of an air-fuel mixture burned in the engine to a desired air-fuel ratio so that the air-fuel mixture forming device forms a rich air-fuel mixture having an air-fuel ratio lower than the desired air-fuel ratio and further provides a spark in the treating device, retards the engine ignition timing, or supplies secondary air into the engine exhaust gases fed to the treating device when the temperature in the treating device is less than the first predetermined temperature, and resumes to control the air-fuel ratio to the desired value when the temperature in the treating device is increased higher than the first predetermined temperature, and further stops production of the spark, advances the engine ignition timing to a normal condition, and stops supply of the secondary air when the temperature in the treating device is higher than the second predetermined temperature.

As is well known in the art, internal combustion engines are provided with an exhaust gas treating device such as a thermal reactor which oxidizes burnable components such as hydrocarbons (HC) and carbon monoxide (CO) contained in exhaust gases emitted from the engine to water ($H_2O$) and carbon dioxides ($CO_2$). In this instance, when the engine employs a rich air-fuel mixture having an air-fuel ratio lower than a stoichiometric air-fuel ratio, although the production of nitrogen oxides ($NO_x$) is reduced, the production of hydrocarbons and carbon monoxide is increased. As a result, the intensity of the combustion of the engine exhaust gases is increased in the exhaust gas treating device to undesirably increase the temperature therein to, for example, above 1,000° C. which damages the exhaust gas treating device. Furthermore, the use of the rich air-fuel mixture results in increase in fuel consumption.

Thus, it is considered to employ a lean air-fuel mixture having a stoichiometric air-fuel ratio or an air-fuel ratio near same and simultaneously to increase the amount of the engine exhaust gases recirculated into a combustion chamber of the engine to prevent the production of nitrogen oxides from being increased by the use of the lean air-fuel mixture. However, when the engine employs such a lean air-fuel mixture, there is a possibility or danger that the temperature in the exhaust gas reburning device is reduced lower than the lowest reaction retaining temperature below which the engine exhaust gases cannot continue to react or reburn in the exhaust gas treating device or the device cannot function to satisfactorily purify the engine exhaust gases when the temperature of the engine exhaust gases is low as during low speed and low load operations or when the temperature in the exhaust gas treating device is low as during starting operations. As a result, the exhaust gas treating device allows the engine exhaust gases containing large quantities of untreated burnable components to be discharged into the atmosphere. This is because the lowest reaction retaining temperature is increased as the air-fuel ratio of an air-fuel mixture burned in the engine is increased, since the content of a burnable component such as carbon monoxide contained in the engine exhaust gases is abruptly reduced as the air-fuel ratio of the air-fuel mixtue is increased.

In this instance, in order to render it possible for the exhaust gas treating device to treat or satisfactorily treat the engine exhaust gases, it is necessary to, by temporarily varying or increasing the desired air-fuel ratio of the air-fuel mixture to a lower air-fuel ratio corresponding to the lowest reaction retaining temperature equal to the reduced temperature in the exhaust gas treating device at that time and by locking the desired air-fuel ratio in the lower air-fuel ratio to increase the contents of the burnable components contained in the engine exhaust gases, make the reduced temperature in the exhuast gas treating device at that time into the lowest reaction retaining temperature to render it possible for the engine exhaust gases to burn in the exhuast gas treating device to thereby increase the temperature in the exhaust gas treating device to or above the lowest reaction retaining temperature corresponding to the desired air-fuel ratio to restore the desired air-fuel ratio to a set or initial value.

On the other hand, internal combustion engines are also provided with an air-fuel ratio control device for maintaining the air-fuel ratio of the air-fuel mixture at the desired air-fuel ratio by sensing the concentration of a component contained in the engine exhaust gases and by adjusting in accordance with the sensed concentration of the component the flow of fuel fed into the engine from an air-fuel mixture forming device. However, since the air-fuel ratio control device controls the air-fuel ratio of the air-fuel mixture to the desired value independently of the temperature in the exhaust gas treating device or of the engine exhaust gases, it has maintained the air-fuel ratio of the air-fuel mixture at the desired air-fuel ratio even when the temperature in the exhaust gas treating device has been reduced below the lowest reaction retaining temperature corresponding to the desired air-fuel ratio.

It is, therefore, an object of the invention to provide an exhaust gas reaction control system which, when the temperature in the exhaust gas treating device is reduced below the lowest reaction retaining temperature corresponding to the desired air-fuel ratio, temporarily stops the operation or function of the air-fuel ratio control device and has the air-fuel mixture forming device form only an enriched air-fuel mixture burned in the engine so that the temperature in the exhaust gas treating device is maintained at or above the lowest reaction retaining temperature to render it possible for the exhaust gas treating device to purify the engine exhaust gases during all operations of the engine.

It is a further object of the invention to provide an exhaust gas reaction control system for maintaining the temperature in the exhaust gas treating device within a desired temperature range within which the exhaust gas treating device can purify the engine exhaust gases and is provided from being damaged by undesirably high temperature.

These and other objects and advantages of the invention will become more apparent from the following detailed description taken in connection with the accompanying drawings in which.

Figure 1:
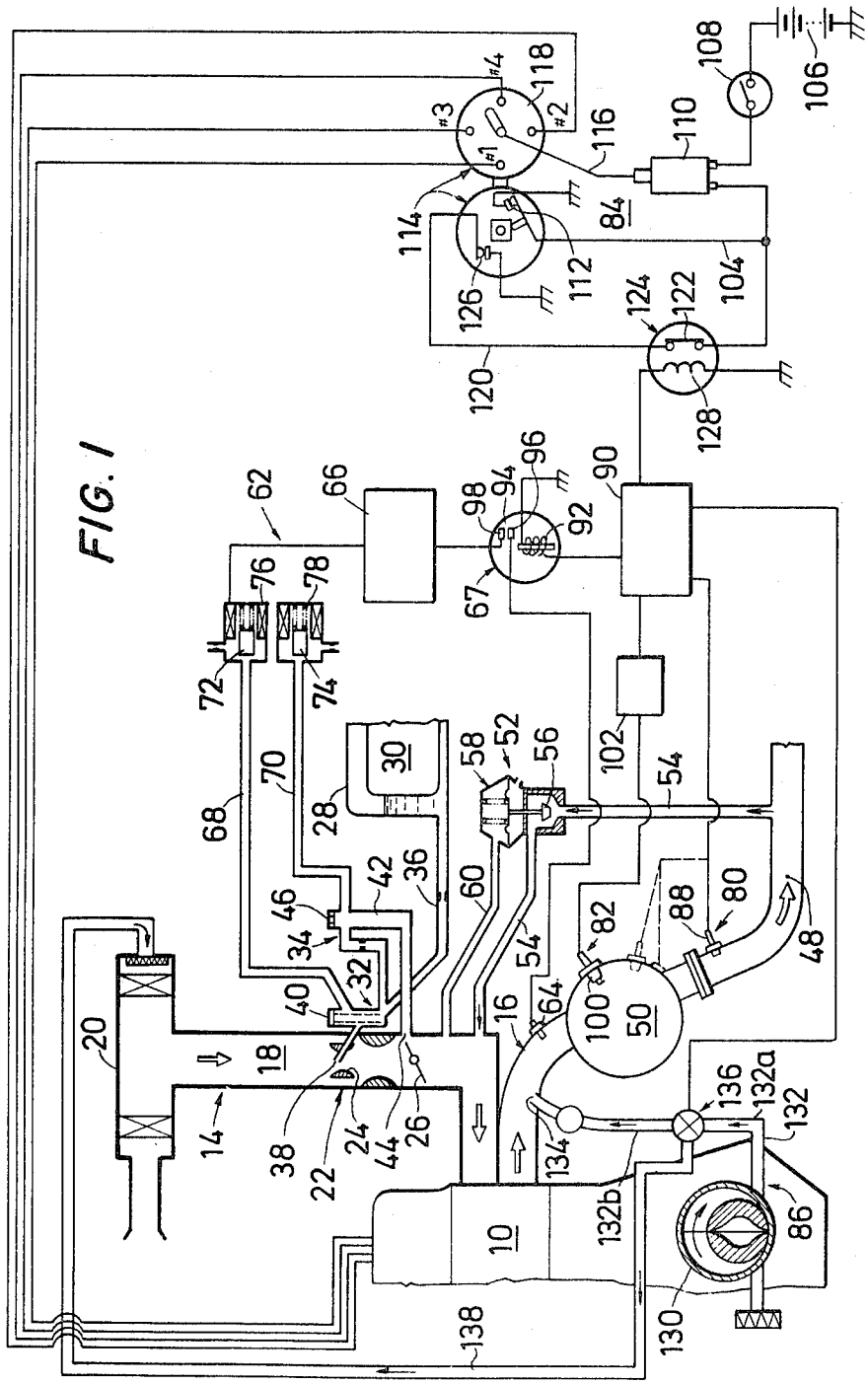
FIG. 1 is a schematic view of a preferred embodiment of an exhaust gas reaction control system according to the invention.
Figure 3:
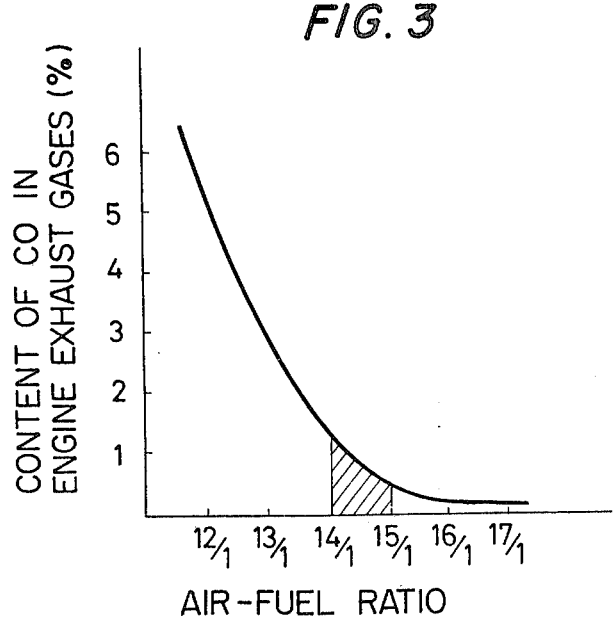

FIG. 3 is a graphic representation of the relationship between the air-fuel ratio of the air-fuel mixture and the content of carbon monoxide (CO) contained in the engine exhaust gases; and Referring to FIG. 1 of the drawings, there is shown an internal combustion engine 10 and an exhaust gas reaction control system according to the invention which is combined with the engine 10. The engine 10 includes intake and exhaust systems 14 and 16. The intake system 14 includes an intake passage or conduit 18 communicating with the atmosphere through an air cleaner 20 and with the engine 10, and an air-fuel mixture forming device which is a carburetor 22 in this embodiment.

The carburetor 22 includes a portion of the intake passage 18 which portion has a choke or venturi 24 formed therein and a throttle valve 26 rotatably mounted therein, a fuel bowl 28 containing liquid fuel 30 therein, a main system 32 and an idling and slow running system 34. The main system 32 has a main fuel passage 36 communicating with the fuel bowl 28, a main nozzle 38 opening into the venturi 24 and communicating with the main fuel passage 36, and a main air bleed 40 communicating with the atmosphere and with the main fuel passage 36 and through which air is drawn thereinto to emulsify fuel drawn from the main nozzle 38 into the intake passage 18. The idling and slow running system 34 has an idling and slow running fuel passage 42 branching from the main fuel passage 36 and having a slow running port 44 opening into the intake passage 18 immediately downstream of the throttle valve 26 in its fully closed position, and an idling and slow running air bleed 46 communicating with the atmosphere and with the idling and slow running fuel passage 42 and through which air is drawn thereinto to emulsify fuel drawn therefrom into the intake passage 18. A fuel injector may be employed as the mixture forming device in place of the carburetor 22.

The exhaust system 16 includes an exhaust gas passage or conduit 48 providing communication between an exhaust port (not shown) of the engine 10 and the atmosphere. An exhaust gas treating device 50 such as a thermal or catalytic reactor is disposed in the exhaust gas passage 48 and purifies burnable noxious components contained in exhaust gases emitted from the engine 10 and renders the engine exhaust gases harmless.

The engine 10 is provided with an exhaust gas recirculation (EGR) device 52 for recirculating the engine exhaust gases into a combustion chamber (not shown) of the engine 10 to lower the peak combustion temperature in the combustion chamber to reduce the amount of nitrogen oxides ($NO_x$) produced by high temperature combustion of an air-fuel mixture therein. The EGR device 52 includes and EGR passage 54 branching from the exhaust gas passage 48 upstream of or downstream of the exhaust gas treating device 50 and opening into the intake passage 18 downstream of the throttle valve 26, an EGR valve 56 disposed in the EGR passage 54, and an actuator 58 operable in response to the vacuum in the intake passage 18 downstream of the throttle valve 26 which vacuum is fed through a conduit 60 to cause the EGR valve 52 to meter the flow of the engine exhaust gases fed or drawn into the intake passage 18.

The engine 10 is also provided with an air-fuel ratio control device 62 for controlling the air-fuel ratio of an air-fuel mixture burned in the engine 10 to a desired value. The air-fuel ratio control device 62 comprises sensing means 64 located in the exhaust gas passage 48 upstream of the exhaust gas treating device 50. The sensor 64 senses the concentration of a component such as oxygen ($O_2$), carbon monoxide (CO), carbon dioxides ($CO_2$), hydrocarbons (HC) or nitrogen oxides ($NO_x$) contained in the engine exhaust gases which concentration is a function of the air-fuel ratio of an air-fuel mixture burned in the engine 10. The sensor 64 generates an electric output signal having a value representative of the sensed concentration of the component. The output signal of the sensor 64 is fed to a first control circuit 66 when connection is provided therebetween by switch means 67 which will be described hereinafter. The control circuit 66 compares the value of the concentration signal from the sensor 64 with a reference value representative of a desired air-fuel ratio of the air-fuel mixture burned in the engine 10. The desired air-fuel ratio is a value at which the exhaust gas reburning device 50 most satisfactorily or efficiently purifies the engine exhaust gases. The desired air-fuel ratio is a stoichiometric air-fuel ratio when the exhaust gas reburning device 50 is a catalytic converter having a ternary or three-way catalyst. The control circuit 66 generates an electric control or command signal having a value or width representative of the relationship between the value of the concentration signal and the reference value such as the difference or the largeness or smallness therebetween. The control signal of the control circuit 66 is fed to fuel flow control means cooperating with the mixture forming device and adjusting in accordance with the control signal from the control circuit 66 the amount or flow of fuel fed from the mixture forming device into the engine 10 to control the air-fuel ratio of the air-fuel mixture to the desired value. In this embodiment the fuel flow control means is constructed and arranged to increase and reduce the flow of fuel drawn into the intake passage 18 from the main and idling and slow running fuel passages 36 and 42 to correct the air-fuel ratio to the desired value, by reducing and increasing the amount of air drawn thereinto for emulsification of the fuel and comprises first and second auxiliary air bleeds 68 and 70 communicating with the atmosphere and respectively with the main and idling and slow running fuel passages 36 and 42 and through which air is drawn thereinto in addition to the air from the main and idling and slow running air bleeds 40 and 46, first and second control valves 72 and 74 operable to open and close the first and second auxiliary air bleeds 68 and 70, and first and second operating means 76 and 78 electrically connected to the control circuit 66 to receive the command signal thereof and operatively connected to the first and second control valves 72 and 74. Assuming that the sensor 64 is an oxygen sensor, when the concentration signal value is larger than the reference value, that is, the sensed air-fuel ratio is higher than the desired air-fuel ratio, the command signal causes the fuel flow control means to increase the amount of fuel fed into the engine 10 from the mixture forming device. In this instance, in this embodiment the operating means 76 and 78 cause the control valves 72 and 74 in response to the command signal to close the auxiliary air bleeds 68 and 70 to inhibit the additional air to be drawn into the fuel passages 36 and 42 to increase the flow of the fuel drawn into the intake passage 18 to correct the air-fuel ratio of the air-fuel mixture to the desired value. On the contrary, when the concentration signal value is smaller than the reference value, that is, the sensed air-fuel ratio is lower than the desired air-fuel ratio, the command signal causes the fuel flow control means to reduce the amount of fuel fed from the mixture forming device into the engine 10. At this time, in this embodiment the operating means 76 and 78 cause the control valves 72 and 74 to open the auxiliary air bleeds 68 and 70 in response to the command signal to allow the additional air to be drawn into the fuel passages 36 and 42 to reduce the flow of the fuel drawn into the intake passage 18 to correct the air-fuel ratio of the air-fuel mixture to the desired value.

The fuel flow control means may comprise an auxiliary fuel passage bypassing the main fuel passage 36 upstream of the branching point of the idling and slow running fuel passage 42 and valve means for opening and closing the auxiliary fuel passage in accordance with the control signal of the control circuit 66, in place of the auxiliary air bleeds 68 and 70, the control valves 72 and 74 and the operating means 76 and 78. When a fuel injector is employed as the mixture forming device, the flow of the fuel fed into the engine 10 is adjusted by adjusting in accordance with the command signal the flow of fuel injected from the fuel injector.

The exhaust gas reaction control system serves to keep the temperature in the exhaust gas treating device 50 above a first predetermined level during operations of the engine 10 at which level the engine exhaust gases commences to react or burn in the exhaust gas treating device 50 or above which level the device 50 functions to satisfactorily or efficiently purify the engine exhaust gases. The exhaust gas reaction control system further serves to keep the temperature in the exhaust gas treating device 50 below a second predetermined level during operations of the engine 10 below which level the device 50 is prevented from being undesirably or excessively heated and from being damaged by undesirably high temperatures. The first and second predetermined levels or temperatures can be assumed to be, for example, 600° C. and 1,000° C. or 800° C. and 900° C., respectively. The exhaust gas reaction control system comprises an air-fuel ratio control stopping device 80 or a combination of the device 80 and one or more of an exhaust gas ignition device 82, an engine ignition timing control device 84 and a secondary air supply device 86.

Figure 2:
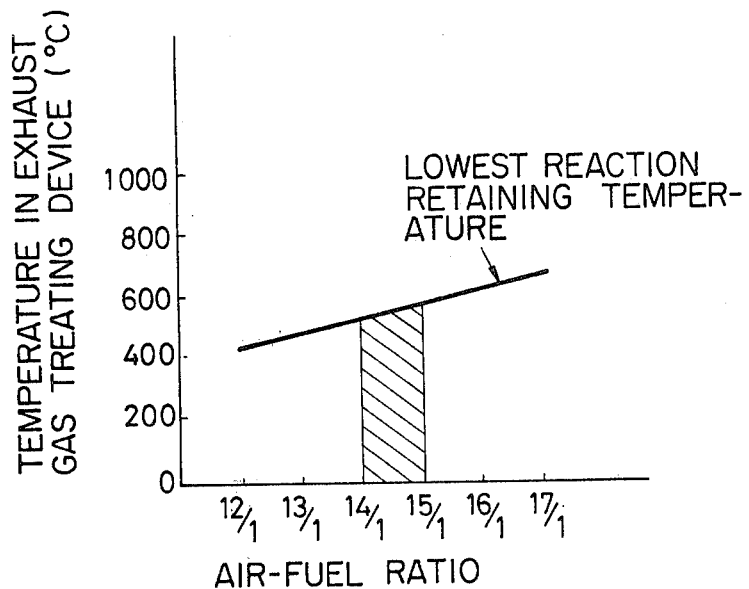
FIG. 2 is a graphic representation of the relationship between the air-fuel ratio of an air-fuel mixture burned in the engine and the lowest reaction retaining temperature.

Referring to FIGS. 2 and 3 of the drawings, FIG. 2 illustrates the relationship between the air-fuel ratio of an air-fuel mixture burned in an engine and the lowest reaction retaining temperature in an exhaust gas treating device at which temperature exhaust gases from the engine begins to react or burn in the exhaust gas treating device as per the introduction of the present specification, while FIG. 3 illustrates the relationship between the air-fuel ratio of the air-fuel mixture and the concentration of carbon monoxide (CO) contained in the engine exhaust gases resulting from the combustion of the air-fuel mixture. As is apparent from FIG. 2, the lowest reaction retaining temperature increases as the air-fuel ratio increases. This is because a higher temperature is necessary for retaining reaction of the engine exhaust gases in the exhaust gas treating device as the air-fuel ratio of the air-fuel mixture increases, since as is apparent from FIG. 3 the content of a burnable component such as carbon monoxide (CO) in the engine exhaust gases reduces as the air-fuel ratio of the air-fuel mixture increases.

The air-fuel ratio control stopping device 80 contemplates to, when the temperature in the exhaust gas treating device 50 is reduced below the lowest reaction retaining temperature corresponding to the desired air-fuel ratio of the air-fuel ratio control device 62 or of the air-fuel mixture burned in the engine 10, make the reduced temperature in the device 50 at that time into the lowest reaction retaining temperature to render it possible for the engine exhaust gases to burn in the device 50 to increase the temperature therein to the lowest reaction retaining temperature corresponding to the desired air-fuel ratio to restore it to a set initial value by temporarily varying or increasing the desired air-fuel ratio to a lower air-fuel ratio coresponding to the lowest reaction retaining temperature equal to the reduced temperature in the devide 50 at that time or to a suitable lower air-fuel ratio and by locking the desired air-fuel ratio in the lower air-fuel ratio to increase the contents of burnable components contained in the engine exhaust gases.

The air-fuel ratio control stopping device 80 comprises sensing means 88 such as a thermister or thermocouple which is located in the exhaust gas reburning device 50 or on an external wall surface thereof or in the exhaust gas passage 48 adjacent to or downstream of the exhaust gas treating device 50. The sensor 88 senses a temperature representative of the temperature of the engine exhaust gases or the temperature in the exhaust gas treating device 50 and generates an electric output signal having a value representative of the sensed temperature. The output signal of the sensor 88 is applied to a second control circuit 90 electrically connected to the sensor 88. The device 80 also comprises the switch means 67 located between the sensor 64 and the first control circuit 66 and between the first and second control circuits 66 and 90. The relay switch 67 includes a relay coil 92 electrically connected to the second control circuit 90, and a relay switch 94 having movable and stationary contacts 96 and 98 electrically connected to the sensor 64 and to the first control circuit 66.

The combination of the engine 10 and the air-fuel ratio control stopping device 80 is operated as follows:

When the sensor 88 feeds the temperature signal to the second control circuit 90, the control circuit 90 compares the value of the temperature signal with a first reference value corresponding to or representative of the first predetermined temperature. When the temperature signal value is less than the reference value, that is, the temperature in the exhaust gas treating device 50 is below the first predetermined value the control circuit 90 generates a first electric output or command signal which is fed to the relay coil 92 and causes it to open the relay switch 94 to disconnect the first control circuit 66 from the sensor 64. As a result, the air-fuel ratio control device 62 stops controlling the air-fuel ratio of the air-fuel mixture to the desired value. Simultaneously, the control circuit 66 generates a command signal which causes the fuel flow control means to increase the flow of the fuel fed from the mixture forming device to the engine 10. In this instance, in this embodiment the command signal causes the operating means 76 and 78 to close the control valves 72 and 74 to inhibit the additional air to be drawn into the fuel passages 34 and 42. As a result, the flow of the fuel fed into the intake passage 18 from the fuel passages 34 and 42 is increased to reduce the air-fuel ratio of the air-fuel mixture burned in the engine 10. Accordingly, the contents of burnable noxious components in the engine exhaust gases are increased to lower the lowest desirable exhaust gas reaction temperature so that the exhaust gas treating device 50 begins to purify the engine exhaust gases or it is rendered possible for the device 50 to satisfactorily purify the engine exhaust gases. When the temperature signal value becomes greater than the second reference value, that is, the temperature in the exhaust gas purifying device 50 exceeds the second predetermined value, the second control circuit 90 generates a second electric output or command signal which causes the relay coil 92 to close the relay switch 94 to connect the sensor 64 to the first control circuit 66. As a result, the air-fuel ratio control device 62 resumes to control the air-fuel ratio of the air-fuel mixture to the desired value.

Further when the sensor 88 senses the temperature in the exhaust gas treating device 50 being higher than the second predetermined temperature, the second control circuit 90 generates the second electric output or command signal which causes the relay coil 92 to close the relay switch 94 and simultaneously the first control circuit 66 is able to generate a command signal which causes the fuel flow control means to reduce the flow of the fuel fed into the engine or the operating means 76 and 78 to open the control valve 72 and 74 to allow the additional air to be drawn into the fuel passages 36 and 42 to reduce the flow of the fuel fed into the intake passage 18. This is to have the mixture forming device to form a lean air-fuel mixture which produces engine exhaust gases having reduced amounts of burnable components to cause reduction in the temperature in the exhaust gas treating device 50. The reason that the just mentioned command signal reduces the flow of fuel fed to the engine is that a rich air-fuel mixture is still temporarily flowing over the sensor 64 at this time.

The exhaust gas ignition device 82, the engine ignition timing device 84 and the secondary air supply device 86 each serve to maintain the temperature in the exhaust gas purifying device 50 within a predetermined or desired temperaure range the minimum and maximum of which are equal respectively to the first and second predetermined temperatures.

The exhaust gas ignition device 82 comprises a spark plug 100 located in the exhaust gas treating device 50, and a high voltage generator 102 electrically connected to the spark plug 100 and to the second control circuit 90.

The combination of the engine 10 and the exhaust gas ignition device 82 thus far described is operated as follows:

When the sensor 88 senses the temperature in the exhaust gas reburning device 50 being less than the first predetermined value and the second control circuit 90 generates the first output signal, the high voltage generator 102 generates a high voltage in response to the first output signal from the control circuit 90 so that the spark plug 100 provides a spark in the device 50 to facilitate ignition of and promote combustion of the engine exhaust gases in the device 50 to cause increase in the temperature therein. In this instance, the spark in the device 50 makes possible ignition of engine exhaust gases resulting from an airfuel mixture which is so lean that ignition of the exhaust gases is impossible unless a spark is provided. When the sensor 88 senses the temperature in the device 50 being increased higher than the second value the second control circuit 90 compares the temperature signal value with a second reference value corresponding to or representative of the second predetermined temperature and generates a second electric output signal. The high voltage generator 102 stops generation of the high voltage in response to the third output signal from the control circuit 90 so that the spark plug 100 ceases production of the spark to lighten combustion in the device 50 to reduce the combustion temperature therein. By repetition of the above-mentioned operation, the temperature in the device 50 is maintained within the desired temperature range.

The engine ignition timing control device 84 comprises a primary circuit 104 including an electric power source 106, an ignition switch 108, an ignition coil 110 and a usual or normal ignition timing breaker contact 112 of an ignition distributor 114 connected in series to each other, a secondary circuit 116 including the ignition coil 110 and a high voltage current distributor 118 of the ignition distributor, 114 connected in series to each other, and an ignition timing retarding circuit 120 including a relay switch 122 of a relay 124 and a retarding breaker contact 126 connected in series to each other. The ignition timing retarding circuit 120 is connected to the second control circuit 90 by way of a relay coil 128 of the relay 124 and in parallel to the primary circuit 104. The retarding breaker contact 126 is set to be opened later than the usual ignition timing breaker contact 112 at every cycle of the engine 10. When the relay switch 122 is opened, the engine 10 is ignited at a normal timing by the usual breaker contact 112 at every cycle.

The combination of the engine 10 and the ignition timing control device 84 thus far described is operated as follows:

When the sensor 88 senses the temperature in the exhaust gas treating device 50 being lower than the first predetermined level, the first output signal of the control circuit 90 is fed to the relay 124 to cause the relay coil 128 to close the delay switch 122 to complete the ignition timing retarding circuit 120. Since the retarding breaker contact 126 is connected in parallel with the normal breaker contact 112 due to the completion of the circuit 120, a high voltage is not yet generated in the secondary circuit 116 so as not to produce a spark in a combustion chamber of the engine 10 when the normal ignition timing breaker contact 112 is opened and the retarding breaker contact 126 is still closed. The high voltage is generated in the secondary circuit 116 to produce the spark in the engine combustion chamber when the retarding breaker contact 126 is opened with a time lag after the usual breaker contact 112 has been opened. Accordingly, when the ignition timing retarding circuit 120 is completed, the ignition timing of the engine 10 is retarded by the time lag as compared with when the engine ignition is effected at the normal timing by the usual breaker contact 112. The delay in the ignition timing prolongs the combustion time in the engine combustion chamber to increase the temperature of the engine exhaust gases and accordingly the reaction temperature in the exhaust gas treating device 50. As a result, when the sensor 88 senses the temperature in the device 50 being increased above the second predetermined level, the second output signal of the control circuit 90 is fed to the relay 124 to cause the relay coil 128 to open the relay switch 122 to open the relay switch 122 to open the ignition timing retarding circuit 120 to restore the ignition timing into a normal condition. This causes shortening of the combustion time in the engine combustion chamber to reduce the temperature of the engine exhaust gases. By repetition of the above-mentioned operation, the temperature of the device 50 is maintained at the optimum temperature range.

The secondary air supply device 86 comprises an air pump 130 to discharge secondary air under pressure, passage means 132 communicating at one end with a discharge port of the air pump 130 and opening at the other end into the exhaust gas passage 48 upstream of the exhaust gas treating device 50 through an injecting nozzle 134, the flow path control valve 136 for alternatively communicating the upstream section 132a of the passage means 132 with the downstream section 132b of the passage means 132 and with the atmosphere in accordance with the temperatures of the exhaust gas treating device 50, and branch passage means 138 communicating at one end with the upstream section 132a through the control valve 136 and opening at the other end into the air cleaner 20. The control valve 136 includes an actuator such as a solenoid (not shown) which is electrically connected to the control circuit 90 to receive the first and second output signals therefrom and operates the control valve 136 to communicate the upstream section 132a with only the downstream section 132b in response to the first output signal and with only the branch passage means 138 in response to the second output signal.

The combination of the engine 10 and the secondary air supply device 86 thus far described is operated as follows;

When the sensor 88 senses the temperature in the exhaust gas treating device 50 being lower than the first predetermined level, the control valve 136 is operated in response to the first output signal from the control circuit 90 to communicate the air pump 130 with the exhaust gas passage 48 to supply secondary air thereinto so that the combustion of the burnable components in the engine exhaust gases in the device 50 is promoted to cause increase in the combustion temperature therein. As a result, when the sensor 88 senses the temperature in the device 50 being increased higher than the second predetermined level, the control valve 136 is operated in response to the second output signal from the control circuit 90 to switch over connection of the upstream section 132a from the downstream section 132b to the branch passage means 138 to stop supply of secondary air into the exhaust gas passage 48 and to divert, secondary air to the air cleaner 20. As a result, the intensity of the combustion in the device 50 is reduced to bring the temperature in the device 50 into the desired temperature range. By repetition of the above-mentioned operation, the temperature in the device 50 is maintained at the desired temperature range.

It will be appreciated that the invention provides an exhaust gas reaction control system which interrupts to control the air-fuel ratio of an air-fuel mixture burned in the engine to a desired value and has an air-fuel mixture forming device form a rich air-fuel mixture when the temperature in an exhaust gas treating device is less than a first predetermined value and resuming to control the air-fuel ratio of the air-fuel mixture to the desired value when the treating device temperature is higher than the predetermined value, and further provides a spark in the treating device, supplies secondary air into engine exhaust gases fed to the treating device, and/or retards the engine ignition timing when the treating device temperature is less than the predetermined value, and stops generation of the spark and supply of the secondary air and restores the engine ignition timing to a normal condition when the treating device temperature is higher than a second predetermined value, so that the treating device temperature is maintained above the first predetermined value to cause the engine exhaust gases to satisfactorily react in the treating device to cause it to satisfactorily or efficiently purify the engine exhaust gases and below the second predetermined value to prevent the treating device from being damaged by heat to eliminate the occurrence of secondary public nuisance, and further the engine is fed with a minimum of fuel to reduce the rate of fuel consumption.

The exhaust gas treating device may be merely an exhaust manifold which serves to purify engine exhaust gases in place of a thermal reactor or catalytic converter.

Secondary air can be fed or drawn into the exhaust gas passage 48 by a vacuum produced in the exhaust gas passage 48 or in a venturi (not shown) formed therin in place of the air pump 130.

Table 1

|  | Element | Lower Temp $T_1$ | Upper Temp. $T_2$ |
| --- | --- | --- | --- |
| Inputs to ckt. 90 from element | 88 | voltage signal ind. of sensed temp. | |
| Outputs from ckt. 90 to element | 92 | first output or command signal | second output or command signal |
|  | 102 | | |
|  | 128 | | |
|  | 136 | | |

What is claimed is:

1. In a method of operating an internal combustion engine having an induction system including an air-fuel mixture forming device, a combustion chamber, an exhaust system including an exhaust gas purifying device and an exhaust gas recirculation system interconnecting said induction and exhaust systems, the steps of:

recirculating exhaust gases from said exhaust system to said induction system for lowering the peak combustion temperature in said combustion chamber;

sensing the temperature prevailing in said purifying device;

generating a first command signal upon said temperature in said purifying device being sensed at or below a predetermined lower level and continuing to generate said first command signal until the temperature in said purifying device reaches a predetermined upper level;

generating a second command signal upon said temperature in said purifying device being sensed at or above said upper level and continuing to generate said second command signal until the temperature in said purifying device decreases to said lower level;

raising the temperature in said purifying device in response to said first command signal by 1 enriching the air fuel mixture produced by said air-fuel mixture forming means so as to have an air-fuel ratio lower than stoichiometric;

2 retarding the ignition timing of the ignition of said enriched air-fuel mixture in said combustion chamber;

3 supplying secondary air into the exhaust system upstream of said purifying device so as to mix with the combustion products produced by said retarded ignition of said enriched air-fuel mixture;

4 producing sparks in said purifying device so as to positively ignite the mixture of said combustion products and said secondary air and produce heat to raise the temperature within said purifying device;

lowering the temperature within said purifying device in response to said second commmand signal by;

1 leaning said air-fuel mixture produced by said air-fuel mixture forming device;

2 sensing the oxygen content in the exhaust gases in said exhaust system and producing an output signal indicative of the oxygen content sensed;

3 controlling the air-fuel ratio of the air-fuel mixture produced by said air-fuel mixture forming device in accordance with said output signal thus maintaining the temperature within said purifying device at which spontaneous self-supporting combustion therein occurs, substantially constant; p1 4 advancing the ignition timing of the ignition of said leaned air-fuel mixture in said combustion chamber so as to efficiently and rapidly combust said mixture thus reducing the amount of combustible matter contained in the exhaust gases subsequently exhausted into said exhaust system;

5 terminating the supply of secondary air into said exhaust system;

6 terminating the production of sparks in said purifying device; and 7 utilizing the reduced peak combustion temperature by said recirculation of exhaust gas in combination with said steps of leaning, sensing, controlling, advancing, terminating and terminating to feed exhaust gas having a relatively low temperature into said purifying device to facilitate the cooling thereof.

2. A method of operating an internal combustion engine so as to rapidly raise the temperature of an exhaust purifying device associated with said engine and subsequently maintain the temperature within said purifying device within predetermined upper and lower limits, comprising the steps of:

recirculating exhaust gas into the combustion chamber to reduce the peak combustion temperature of the air-fuel mixture combusted therein;

raising the temperature in said purifying device from or from below said lower limit to said upper limit via increasing the concentration of combustible matter in the exhaust gases emitted from said combustion chamber;

mixing secondary air with said exhaust gases prior entry into said purifying device;

igniting and combusting the mixture in said purifying device so as to rapidly heat same to said upper limit; subsequently lowering the temperature in said purifying device from said upper limit to said lower limit via reducing the concentration of combustible matter contained in the exhaust gases emitted from said combustion chamber which in combination with said lowering of said peak combustion temperature via said recirculation of exhaust gases permits exhaust gases having a relatively low temperature and concentration of combustible matter to enter the purifying device thus facilitating the cooling thereof and subsequently repeating said steps of raising and lowering the temperature of said purifying device.

3. In an internal combustion engine having a combustion chamber, an induction system and an exhaust system;

an exhaust gas recirculation system interconnecting said induction and exhaust systems for recirculating exhaust gas from said exhaust system to said induction system according to a schedule which varies in accordance with the load on said engine;

a gas purifying device disposed in said exhaust system for purifying the exhaust gases emitted from said combustion chamber;

a temperature sensor disposed in said exhaust system and arranged to sense the temperature prevailing in said purifying device and produce an electrical signal representative of the sensed temperature;

a control circuit responsive to said electrical signal and arranged to produce a first command signal upon the temperature in said purifying device being sensed at or below a predetermined lower level and continue to produce said first command signal until the temperature in said purifying device is sensed at or above a predetermined upper level, and produce a second command signal upon the temperature in said purifying device being sensed at or above said upper level and continue to produce said second command signal until said temperature in said purifying device is sensed at or below said lower level;

an oxygen sensor disposed in said exhaust system for sensing the concentration of oxygen in said exhaust gases and producing an electrical output signal indicative of said sensed concentration;

an air-fuel mixture forming device disposed in said induction system;

a control apparatus operatively connected to said air-fuel mixture forming device and responsive to said first command signal for causing said air-fuel mixture forming device to form a rich air-fuel mixture and responsive to said second command signal to control the air-fuel ratio of the air-fuel mixture formed by said air-fuel forming device in accordance with said electrical output signal of said oxygen sensor;

an ignition system for producing sparks in said combustion chamber and responsive to said first command signal to retard the ignition timing of said ignition system from the normal timing thereof;

a secondary air supply system for injecting air into said exhaust system upstream of said purifying device in response to said first command signal and relieving said secondary air into the ambient atmosphere in response to said second command signal; and a purifying device ignition system for producing sparks in said purifying device in response to said first command signal.

4. In an internal combustion engine having a combustion chamber, an induction system and an exhaust system;

an exhaust gas recirculation system interconnecting said induction and exhaust systems for recirculating exhaust gas from said exhaust system to said induction system according to a schedule which varies in accordance with the load on said engine;

a gas purifying device disposed in said exhaust system for purifying the exhaust gases emitted from said combusion chamber;

a temperature sensor disposed in said exhaust system and arranged to sense the temperature prevailing in said purifying device and produce an electrical signal representative of the sensed temperature;

a control circuit responsive to said electrical signal and arranged to produce a first command signal upon the temperature in said purifying device being sensed at or below a predetermined lower level and continue to produce said first command signal until the temperature in said purifying device is sensed at or above a predetermined upper level, and produce a second command signal upon the temperature in said purifying device being sensed at or above said upper level and continue to produce said second command signal until said temperature in said purifying device is sensed at or below said lower level;

an oxygen sensor disposed in said exhaust system for sensing the concentration of oxygen in said exhaust gases and producing an electrical output signal indicative of said sensed concentration;

an air-fuel mixture forming device disposed in said induction system; and a control apparatus operatively connected to said air-fuel mixture forming device and responsive to said first command signal for causing said air-fuel mixture forming device to form a rich air-fuel mixture and responsive to said second command signal to control the air-fuel ratio of said air-fuel mixture formed by said air-fuel forming device in accordance with said electrical output signal of said oxygen sensor;

the combination of the above with at least one of (1) an ignition system for producing sparks in said combustion chamber and responsive to said first command signal to retard the ignition timing of said ignition system from the normal timing thereof;

(2) a secondary air supply system for injecting air into said exhaust system upstream of said purifying device in response to said first command signal and relieving said second air into the ambient atmosphere in response to said second command signal; and (3) a purifying device ignition for producing sparks in said purifying device in response to said first command signal.

* * * * *